(12) United States Patent
Wehler

(10) Patent No.: US 6,579,492 B2
(45) Date of Patent: Jun. 17, 2003

(54) FORGED IN BUSHING ARTICLE AND METHOD OF MAKING

(75) Inventor: Dale E. Wehler, St. Mary's, PA (US)

(73) Assignee: Metaldyne Sintered Components, Inc., Ridgway, PA (US)

( * ) Notice: Subject to any disclaimer, the term of this patent is extended or adjusted under 35 U.S.C. 154(b) by 0 days.

(21) Appl. No.: 09/947,981

(22) Filed: Sep. 6, 2001

(65) Prior Publication Data

US 2003/0049151 A1 Mar. 13, 2003

(51) Int. Cl.[7] ............................... B22F 3/17; B22F 3/24
(52) U.S. Cl. ........................ 419/28; 419/8; 419/29; 428/546
(58) Field of Search ........................ 419/8, 28, 29; 428/546

(56) References Cited

U.S. PATENT DOCUMENTS

| | | | |
|---|---|---|---|
| 3,837,068 A | * 9/1974 | Dunn | 29/505 |
| 4,059,214 A | * 11/1977 | Weissmann | 228/265 |
| 4,069,044 A | 1/1978 | Mocarski et al. | |
| 4,353,155 A | * 10/1982 | Hillebrand et al. | 29/149.5 DP |
| 5,312,475 A | 5/1994 | Purnell et al. | |
| 5,462,573 A | 10/1995 | Baker et al. | |
| 5,613,182 A | * 3/1997 | Lynn | 419/28 |
| 6,076,426 A | 6/2000 | Genouille | |
| 6,120,727 A | * 9/2000 | Asaka et al. | 419/6 |

\* cited by examiner

*Primary Examiner*—Ngoclan Mai
(74) *Attorney, Agent, or Firm*—Emch, Schaffer, Schaub & Pocello Co., L.P.A.

(57) ABSTRACT

These forged articles are useful as connecting rods. The bushing is assembled during the forging operation of the powder metal connecting rod. This reduces the number of manufacturing operations required to process a powder metal article. The main components of this article are a sintered powder metal perform and preferably a bronze bushing. The bronze bushing is inserted in the bore of the sintered perform of a connecting rod and thereafter forged in during forging then heated to provide bonding between the bushing and connecting rod.

26 Claims, 1 Drawing Sheet

FORGED IN BUSHING ARTICLE AND METHOD OF MAKING

TECHNICAL FIELD

This invention relates to forged articles made from metal powders. More specifically, the forged articles are forged engine connecting rods with a forged in bushing.

BACKGROUND OF THE INVENTION

The connecting rod manufacturing process involves pressure molding metal particles in a closed mold under significant pressure to produce a green compact form of the rod. Next, the green compact is heated in a furnace sufficiently to form a sintered preform in which metal particles are bonded. Next, the sintered preform is hot forged to final rod shape which increases the rod's density and strength.

The automobile industry continues to challenge connecting rod manufacturers to improve these articles. In many piston powered units, such as compressors and internal combustion engines, full floating piston or wrist pins are used to operatively connect connecting rods with pistons for operating in an associated cylinder. These pins fit into a pin bearing or bushing at the small end of the connecting rod through which the pin extends. Currently, the bushing assembly is realized by pressing in the bushing in a machined forged connecting rod through a separate operation.

BRIEF SUMMARY OF THE INVENTION

In the forged articles or connecting rods of this invention the bushing is assembled during the forging operation of the powder metal article. This reduces the number of manufacturing operations required to process a powder metal article. The main components of this article are a sintered powder metal preform and preferably a bronze bushing. The bronze bushing is inserted in the pin bore of the sintered preform of an article and thereafter forged in during forging. This provides a rough forged article with a forged in bushing that is bonded to the base material. This allows the machining operation to immediately prepare the article for final assembly, thus eliminating the need for the rough boring and pressing operation.

During the forging operation a bushing is inserted into an article such as a connecting rod. The rod is then heated and controlled cooled to allow the bonding of the bushing material to the base material of the rod. One advantage is that the bearing (bushing) push out force is greater than the push out force of the standard interference fit. The insertion also eliminates machining operations and reduces the total cost of manufacturing.

DETAILED DESCRIPTION OF THE INVENTION

Figure 1:
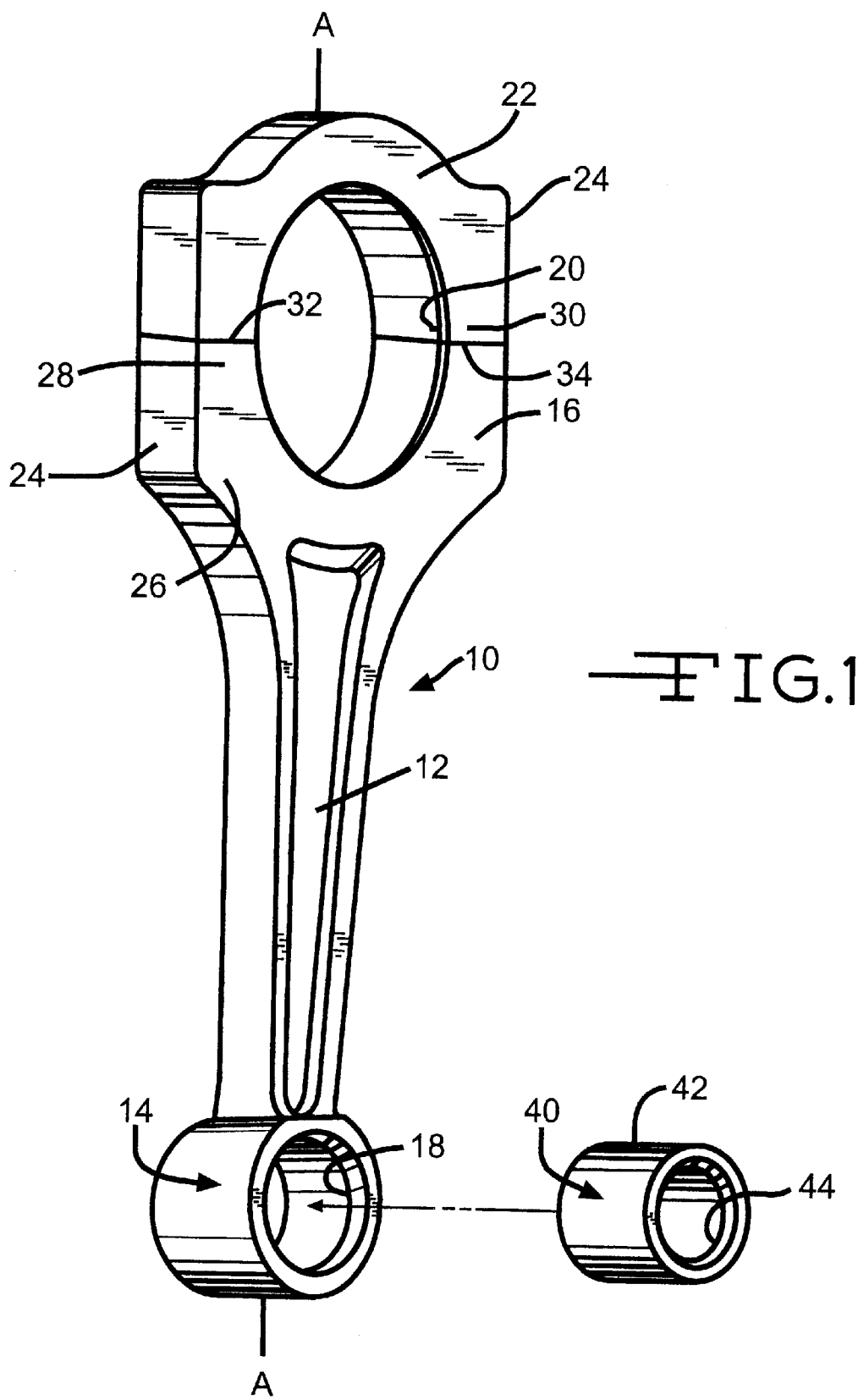
FIG. 1 is an exploded perspective view of a forged connecting rod and bushing.

Industry has long supplied powder forged connecting rods to the automotive industry. The engine plants finish machine the rods to specification for engine build. Based on engine design load and expected performance, a bushing is pressed into the pin end of the rod. Bushings are typically used in higher performance application.

Engine plants receive the rough forged rod and machine material from the bores allowing clearance to press fit the bushing. Then, the pressed bushing is machined to the engine specifications for assembly. My process incorporates the bushing assembly operation in the forging step of a powder metal connecting rod manufacturing process, thus resulting in a cost effective product.

During the forging operation, my process inserts a bushing into a bore in the small end of the rod. Heating the rod during forging effects the thermal expansion of the rod and the bore therein. After forging, the unit then is heated thus allowing the bonding between the rod and bushing. Bringing the rod and bushing to ambient temperature contracts the bore around the bushing and axially traps the bushing in the bore.

Conventional methods carry out the heating and cooling. Typically, this is done in long furnace with a continuous belt conveyor. The heating section is first followed by the cooling section. An external water jacket cools the furnace atmosphere which in turn draws heat from the forged part.

FIG. 1 illustrates forged connecting rod 10. Rod 10 has an elongated configuration extending along longitudinal axis A—A. Rod 10 includes midportion 12; small end portion 14; and large end portion 16. Bore 18 is formed through small end portion 14 adapted to receive a wrist or piston pin (not shown) as is well known in the engine art. In this invention, bore 18 receives bushing 40. Aperture 20 is formed through large diameter end 16 and is adapted to receive a journal of a crankshaft (not shown) as is well known in the engine art. Large end portion 16 has a side thrust face 22. Rod 10 includes large end portion 16 having a pair of oppositely facing edges or end surfaces 24. In the particular design of the connecting rod shown in FIG. 1, side thrust face 22 is in a raised plane with respect to the remaining side surface 26. Side thrust face 22 also includes a pair of radially outwardly extending portions 28, 30 located to either side of aperture 20. Portions 28, 30 extend radially outward from aperture 20 and terminate at end of edges 24.

FIG. 1 also shows a pair of slits or creases 32, 34 formed in the side thrust face including extensions 28, 30. Each crease 32,34 is arranged to one side of aperture 20 and they are substantially aligned across aperture 20. Creases 32, 34 extend inwardly from surfaces 28, 30 to a considerable depth as is evident by examination of leftward end 24 and the cylindrical surface which forms the bore 20.

Bushing 40 fits into bore 18 of small end portion 14. Bushing 40 includes outer surface 42 which engages bore 18. Bushing 40 also includes bore 44 to receive a wrist or piston pin (not shown).

While bushing 40 fits into bore 18, bushing 40 also may be adapted to fit into aperture 20 adapted to receive a journal of a crankshaft. Bushing 40 may readily be adapted to fit into any bore of an article to be forged.

The manufacturing processes for making the connecting rod may vary widely. For example, a green compact is made in the form of the rod by molding powder metal particles in a closed mold under great pressure, typically about 80,000 psi. This pressure molding causes the particles to mechanically interlock and form a stable, relatively weak part but strong enough for handling. Next, the green compact is heated in a furnace at temperatures higher than 2000 degrees F. for a period of time sufficient to cause the metal particles to bond. After sintering, the preform has the same configuration as the green compact but is much stronger.

The preform then is hot forged to achieve the shape and increase density and strength as required for a connecting rod. Typically, it is hot forged in a press at a pressure of about 60,000 psi and at a temperature of higher than 1800 degrees F.

The metal powder I use may vary widely. Typically, the base metal powder is a ferrous powder. The sintered preform may be made by an admixed or prealloyed powder. The ferrous powder typically includes other ingredients such as nickel, molybdenum, copper, carbon and the like. The base ferrous iron is admixed with copper, graphite, manganese, sulfur and a lubricant.

Another recent development in powdered metal uses a commercially available prealloyed manganese, sulfur, ferrous based powder for producing the forged article. The prealloyed powder is mixed with copper and carbon to produce a mix used for connecting rod manufacturing. Both the base powder or prealloyed powder comprise by weight percent:

| Component | Weight Percent |
| --- | --- |
| copper (Cu) | <2.0 to 5.0 |
| carbon (C) | 0.2 to 1.0 |
| base or prealloyed powder | balance |

The bushing also may vary widely. While I prefer a bronze bushing, other materials may be used. Other materials include copper, aluminum, beryllium, and zinc, their alloys and amalgams. The alloys include brass, aluminum brass, copper-beryllium alloys and the like.

The bushing may be a material already at full density. Preferably, the bushing is sintered material which is forged up to full density during the forging operation of this invention. In one embodiment, the bushing is a sintered material at 65 percent dense. After the forging operation, the bushing may increase to full density.

Brass typically comprises copper-zinc alloys of varying composition. Low-zinc brasses (below 20%) are resistant to stress-corrosion cracking and are easily formed. Red brass (15% zinc) is highly corrosion-resistant. Yellow brasses contain 34–37% zinc, have good ductility and high strength, and can withstand severe coldworking. Cartridge brass contains 30–33% zinc. Muntz metal (40% zinc) is primarily a hot-working alloy used where coldforming operations are unnecessary. Some brasses also contain low percentages of other elements, e.g., manganese, aluminum, silicon, lead and tin. Aluminum brass is an alloy containing 76% copper, 21.5–22.5% zinc, and 1.75–2.50% aluminum. Bronze is an alloy of copper and tin usually containing 1–10% tin. Special types contain 5–10% aluminum (Al bronze), fractional percentages of phosphorus (phosphor bronze) as deoxidizer, or low percentages of silicon (Si bronze).

The bronze material I prefer is by weight percent:

| Component | Weight Percent |
| --- | --- |
| copper | 86.0 to 92.0 |
| iron | max. 1.0 |
| carbon | max. 1.9 |
| tin | 9.0 to 11.0 |
| other elements | max. 1.0 | with the total weight percent being 100.0 wt. %. The expression max. is intended to mean that trace amounts of these elements may be present. More preferably, the bronze is by weight percent:

| Component | Weight Percent |
| --- | --- |
| copper | 87.5 to 90.5 |
| iron | max. 1.0 |
| carbon | max. 1.75 |
| tin | 9.5 to 10.5 |
| other elements | max. 0.5 |

This invention may be used to forge articles other than connecting rods. Other automotive uses include piston rings and valve seats for internal combustion engines. Other parts include clutch races, differential gears and similar parts.

In addition to these embodiments, persons skilled in the art can see that numerous modifications and changes may be made to the above invention without departing from the intended spirit and scope thereof.

I claim:

1. A method for manufacturing a forged article from metal powder comprising the steps of:

pressure molding powder metal into a green compact form having a bore therein;

heating the green compact sufficiently to bond the metal particles together forming a sintered preform having a bore therein;

inserting a bushing into the bore of the heated sintered preform, wherein the bushing is made of copper, aluminum, beryllium, zinc, alloys thereof or amalgams thereof;

forging the sintered preform and bushing; and heating the forged preform and bushing to allow bonding between the perform and bushing thereby forming a forged article with a forged in bushing.

2. A method for manufacturing a forged article from metal powder comprising the steps of:

pressure molding powder metal into a green compact form having a bore therein;

heating the green compact sufficiently to bond the metal particles together forming a sintered preform having a bore therein;

inserting a bushing into the bore of the heated sintered preform;

forging the sintered preform and bushing; and heating the forged preform and bushing to allow bonding between the perform and bushing thereby forming a forged article with a forged in bushing wherein the forged article is an engine connecting rod having a bore through a small end portion, wherein the forged in bushing is in the bore of the small end portion.

3. A method for manufacturing a forged article from metal powder comprising the steps of:

pressure molding powder metal into a green compact form having a bore therein;

heating the green compact sufficiently to bond the metal particles together forming a sintered preform having a bore therein;

inserting a bushing into the bore of the heated sintered preform wherein the bushing is a bronze bushing;

forging the sintered preform and bushing; and heating the forged preform and bushing to allow bonding between the perform and bushing thereby forming a forged article with a forged in bushing.

4. A method according to claim 1 wherein the metal powder is a base powder or a prealloyed powder.

5. A method according to claim 1 wherein the forging is carried out at a temperature of above 1800° F.

6. A method for manufacturing a forged article from metal powder comprising the steps of:

pressure molding powder metal into a green compact form having a bore therein;

heating the green compact sufficiently to bond the metal particles together forming a sintered preform having a bore therein;

inserting a bushing into the bore of the heated sintered preform;

forging the sintered preform and bushing; and heating the forged preform and bushing to allow bonding between the preform and bushing thereby forming a forged article with a forged in bushing, wherein the forging is carried out at a temperature of above 1800° F., and wherein the forging is carried out at a pressure of about 60,000 psi.

7. A method according to claim 1 wherein the heating is sufficient to allow bonding between the forged article and bushing.

8. A method according to claim 1 including the step of bringing the forged article to ambient temperature.

9. A method according to claim 8 wherein the step of bringing the article to ambient temperature contracts the bore around the bushing.

10. A forged article having a bore therein and forged from metal powder with a non-ferrous bushing forged in the bore.

11. A forged connecting rod having a bore therein and forged from metal powder with a bronze bushing forged in the bore.

12. A forged connecting rod according to claim 11 wherein the metal powder is a base ferrous powder.

13. A forged connecting rod according to claim 12 wherein the base ferrous powder is mixed with copper and carbon.

14. A forged connecting rod according to claim 12 wherein the ferrous powder is a prealloyed powder.

15. A forged connecting rod according to claim 14 wherein the prealloyed ferrous powder is mixed with copper and carbon.

16. A forged connecting rod according to claim 11 wherein the bronze bushing is at full density.

17. A forged connecting rod according to claim 11 wherein the bronze bushing is a sintered material.

18. A forged connecting rod according to claim 11 wherein the bronze bushing is by weight percent:

| Component | Weight Percent |
| --- | --- |
| copper | 86.0 to 92.0 |
| iron | max. 1.0 |
| carbon | max. 1.9 |
| tin | 9.0 to 11.0 |
| other elements | max. 1.0 |

19. A forged connecting rod according to claim 11 wherein the bronze bushing is by weight percent:

| Component | Weight Percent |
| --- | --- |
| copper | 87.5 to 90.5 |
| iron | max. 1.0 |
| carbon | max. 1.75 |
| tin | 9.5 to 10.5 |
| other elements | max. 0.5 |

20. A sintered preform connecting rod having a bore therein with a bronze bushing disposed within the bore.

21. A method according to claim 1 wherein the bushing is made of copper alloy.

22. A method according to claim 1 wherein the bushing is made of brass.

23. An article according to claim 10 wherein the bushing is made of copper alloy.

24. An article according to claim 10 wherein the bushing is made of brass.

25. A method for manufacturing a forged article from metal powder comprising the steps of:

pressure molding powder metal into a green compact form having a bore therein;

heating the green compact sufficiently to bond the metal particles together forming a sintered preform having a bore therein;

inserting a bushing into the bore of the heated sintered preform, wherein the bushing is made of copper, aluminum, beryllium, zinc, alloys thereof or amalgams thereof, and forging the sintered preform and bushing thereby forming a forged article with a forged in bushing.

26. A method for manufacturing a forged article from metal powder comprising the steps of:

pressure molding powder metal into a green compact form having a bore therein;

heating the green compact sufficiently to bond the metal particles together forming a sintered preform having a bore therein;

inserting a bushing into the bore of the heated sintered preform; and forging the sintered preform and busing;

wherein the forged article is an engine connecting rod having a bore through a small end portion;

wherein the forged in bushing is in the bore of the small end portion.

* * * * *

UNITED STATES PATENT AND TRADEMARK OFFICE
CERTIFICATE OF CORRECTION

PATENT NO.     : 6,579,492 B2
DATED          : June 17, 2003
INVENTOR(S)    : Dale E. Wehler It is certified that error appears in the above-identified patent and that said Letters Patent is hereby corrected as shown below:

<u>Column 4,</u>
Lines 36, 49 and 66, the word "perform" should be -- preform --.

Signed and Sealed this

Twelfth Day of August, 2003

JAMES E. ROGAN
*Director of the United States Patent and Trademark Office*